(12) United States Patent
Renckert et al.

(10) Patent No.: US 11,574,217 B2
(45) Date of Patent: Feb. 7, 2023

(54) MACHINE LEARNING BASED IDENTIFICATION AND CLASSIFICATION OF DATABASE COMMANDS

(71) Applicant: Bank of America Corporation, Charlotte, NC (US)

(72) Inventors: Jennifer T. Renckert, Middleburg, FL (US); Nicolas Kabse, Heartland, TX (US); Jesse S. Newsom, III, Charlotte, NC (US); James D. Ilmonen, McKinney, TX (US); Mayakoothan Krishnan, Frisco, TX (US)

(73) Assignee: Bank of America Corporation, Charlotte, NC (US)

( * ) Notice: Subject to any disclaimer, the term of this patent is extended or adjusted under 35 U.S.C. 154(b) by 203 days.

(21) Appl. No.: 16/910,852

(22) Filed: Jun. 24, 2020

(65) Prior Publication Data
US 2021/0406708 A1   Dec. 30, 2021

(51) Int. Cl.
| | | |
|---|---|---|
| *G06F 16/00* | (2019.01) | |
| *G06N 5/04* | (2006.01) | |
| *G06F 16/242* | (2019.01) | |
| *G06F 16/25* | (2019.01) | |
| *G06N 20/00* | (2019.01) | |

(52) U.S. Cl.
CPC ........... *G06N 5/04* (2013.01); *G06F 16/2443* (2019.01); *G06F 16/252* (2019.01); *G06N 20/00* (2019.01)

(58) Field of Classification Search
CPC ...... G06N 5/04; G06N 20/00; G06F 16/2443; G06F 16/252
See application file for complete search history.

(56) References Cited

U.S. PATENT DOCUMENTS

| | | | |
|---|---|---|---|
| 9,710,461 B2 | 7/2017 | Smith et al. | |
| 9,786,277 B2 | 10/2017 | Rothwell et al. | |
| 10,169,329 B2 | 1/2019 | Futrell et al. | |
| 10,235,353 B1 | 3/2019 | Sanders et al. | |
| 2004/0249632 A1 | 12/2004 | Chacon | |
| 2007/0214425 A1* | 9/2007 | Bala | G06F 16/243 715/764 |
| 2009/0063440 A1 | 3/2009 | Chacon | |
| 2018/0330828 A1 | 11/2018 | Hayter, II | |
| 2018/0357415 A1* | 12/2018 | Dhondse | B25J 9/163 |
| 2021/0200662 A1* | 7/2021 | Li | G06F 21/563 |
| 2021/0377278 A1* | 12/2021 | Yin | H04L 63/105 |

* cited by examiner

*Primary Examiner* — Hung Q Pham
(74) *Attorney, Agent, or Firm* — Banner & Witcoff, Ltd.

(57) ABSTRACT

Aspects of the disclosure relate to a machine learning based identification and classification of database commands. A computing platform may retrieve, by a computing device and from a first database of a plurality of databases, a database command. Subsequently, the computing platform may identify, by the computing device and for the database command and based on a machine learning model, one or more database commands from the plurality of databases, wherein the one or more database commands perform operations similar to the database command. Then, the computing platform may determine, by the computing device and for the database command, a security score indicative of a level of vulnerability associated with the database command. Subsequently, the computing platform may provide, via an interactive graphical user interface, the database command and the security score.

19 Claims, 6 Drawing Sheets

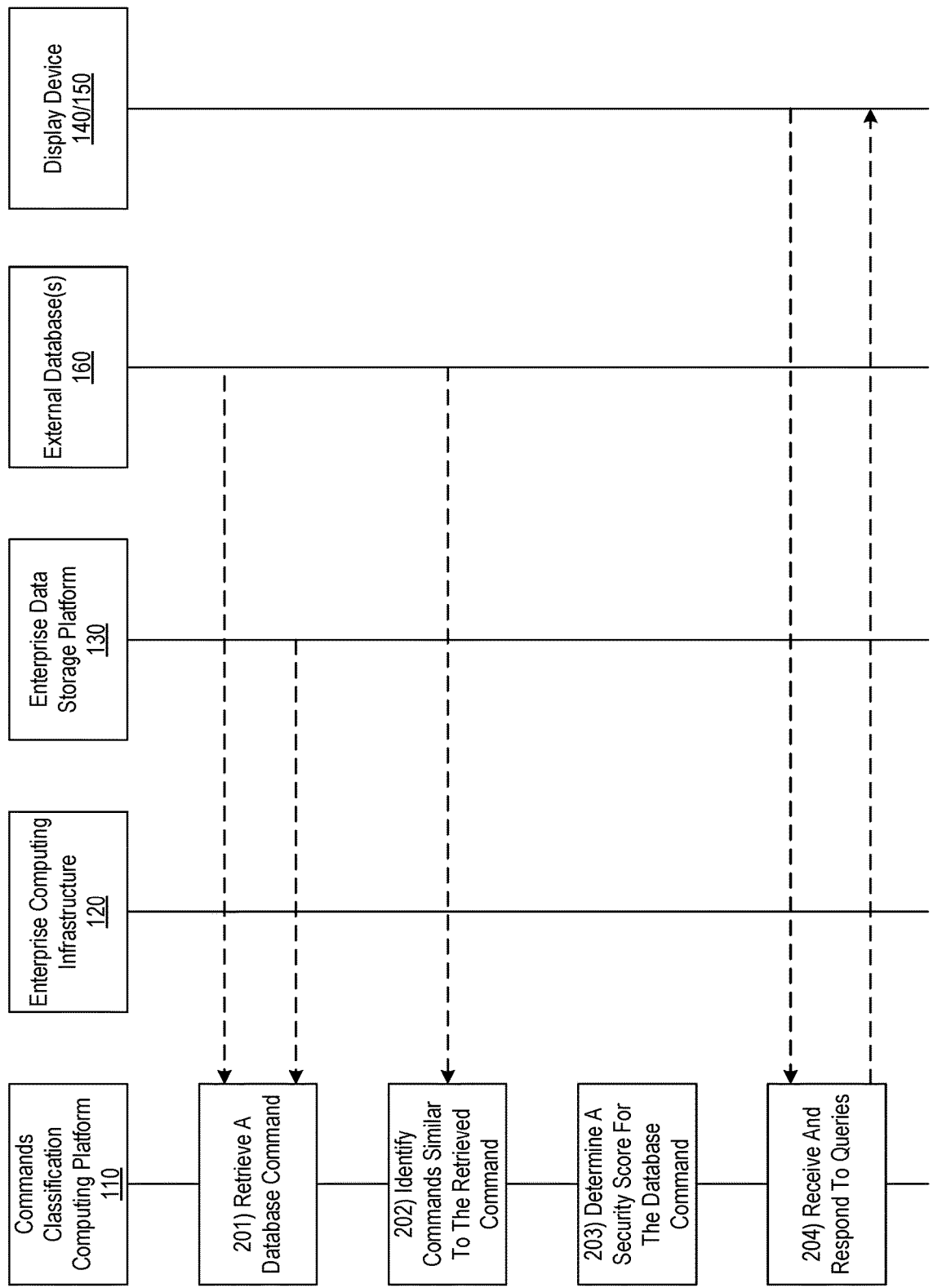

MACHINE LEARNING BASED IDENTIFICATION AND CLASSIFICATION OF DATABASE COMMANDS

BACKGROUND

Aspects of the disclosure relate to deploying digital data processing systems to create and/or manage data structures. In particular, one or more aspects of the disclosure relate to a machine learning based identification and classification of database commands.

Enterprise organizations may utilize various computing infrastructure to manage and/or store data and information related to a business of the enterprise organization. For example, one or more databases may be utilized. Generally, databases may include a large number of database commands that may facilitate interactions with the database. Also, different databases may include different database commands. In some instances, different databases may include different commands to perform similar operations. Generally, due to the complexities of various database structures, subject matter experts may have knowledge of a subset of the databases, and/or a subset of the database commands within a database. One or more attributes of a database may change over time. For example, a syntax of a database command may change, a new database structure may be added, an existing database structure may be modified, and so forth. Such changes may occur due to one or more factors, such as, for example, a change to a business need, a technology simplification, a performance based modification, and so forth. Also, databases may need to be monitored for security compliance, and changes to the one or more attributes of a database may impact functioning of a database, and/or impact its compliance with a security profile of the enterprise organization. Ensuring that such information on databases is available in a timely and searchable manner, and changes, updates, and/or monitoring activities are performed seamlessly, may be highly advantageous to providing an efficient and effective platform to users. In many instances, providing an updated, searchable database, while also optimizing the resource utilization, bandwidth utilization, and efficient operations of the computing infrastructure involved in maintaining, accessing, and/or manipulating the database, may be of may be of high significance to an enterprise organization.

SUMMARY

Aspects of the disclosure provide effective, efficient, scalable, fast, reliable, and convenient technical solutions that address and overcome the technical problems associated with a machine learning based identification and classification of database commands.

In accordance with one or more embodiments, a computing platform having at least one processor, and memory storing computer-readable instructions that, when executed by the at least one processor, cause the computing platform to retrieve, by a computing device and from a first database of a plurality of databases, a database command. Subsequently, the computing platform may identify, by the computing device and for the database command and based on a machine learning model, one or more database commands from the plurality of databases, wherein the one or more database commands perform operations similar to the database command. Then, the computing platform may determine, by the computing device and for the database command, a security score indicative of a level of vulnerability associated with the database command. Subsequently, the computing platform may provide, via an interactive graphical user interface, the database command and the security score.

In some embodiments, the computing platform may determine, by the computing device and based on the security score, whether the database command has to be monitored by the computing device.

In some embodiments, the computing platform may receive, via the graphical user interface, a query. Then, the computing platform may provide, via the graphical user interface and by searching a searchable repository, a response to the query.

In some embodiments, the computing platform may store, by the computing device and in the searchable repository, an association between the database command and the one or more database commands.

In some embodiments, the computing platform may store, by the computing device and in the searchable repository, store, by the computing device and in the searchable repository, an association between the database command and the security score.

In some embodiments, the query may be for a list of database commands that are associated with a high level of vulnerability, where the response to the query may be based on a ranking of the database commands from the plurality of databases, and where the ranking may be based on security scores associated with the database commands.

In some embodiments, the computing platform may retrieve, from the plurality of databases, one or more log files. Then, the computing platform may identify, by parsing the one or more log files, a second database command that was previously performed, where the security score for the second database command is based on the one or more log files.

In some embodiments, the computing platform may determine, by the computing device and based on the security score, a second database command, from the plurality of databases, that may not be performed on the first database.

In some embodiments, the computing platform may identify, by the computing device and for the database command, an operating environment, where the security score for the database command is based on the operating environment.

In some embodiments, the computing platform may determine, by the computing device, a first security score for a first database command of the first database. Then, the computing platform may associate, with a second database command of a second database of the plurality of databases, the first security score, wherein the second database command performs operations similar to the first database command.

In some embodiments, the computing platform may train the machine learning model to identify the one or more database commands.

In some embodiments, the computing platform may train the machine learning model to determine the security score for the first database.

In some embodiments, the computing platform may train the machine learning model to determine an access restriction of a user to the first database.

In some embodiments, the computing platform may train the machine learning model to determine whether the database command has to be monitored by the computing device.

In some embodiments, the computing platform may identify, by the computing device, that the database command has been performed. Then, the computing platform may determine, by the computing device, an access restriction of a user that has caused the database command to be performed, where the security score for the database command is based on the access restriction of the user.

In some embodiments, the computing platform may determine, based on the security score, an access restriction of a user to the first database.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 2 depicts an illustrative event sequence for a machine learning based identification and classification of database commands;

DETAILED DESCRIPTION

Figure 1A:
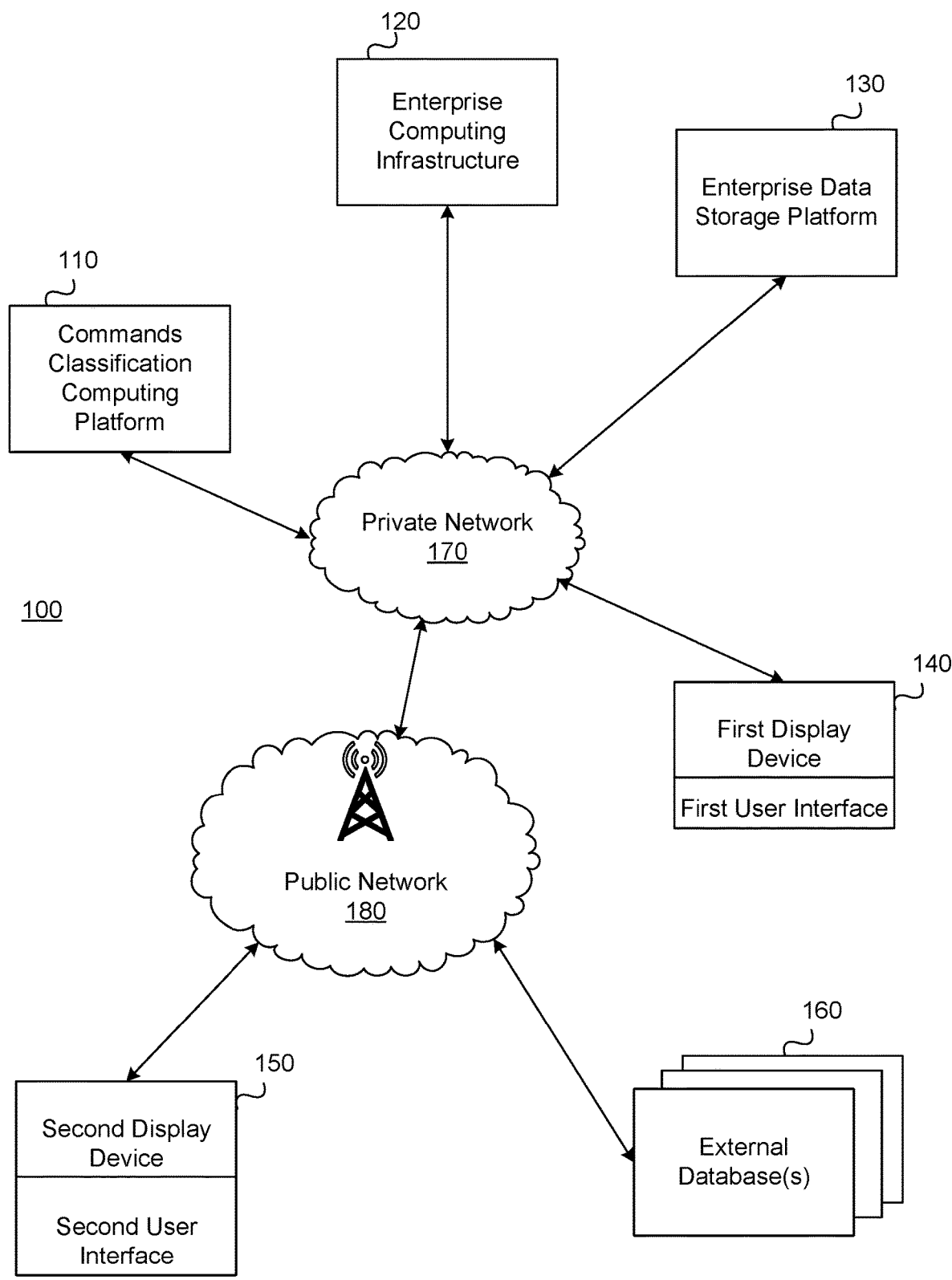
FIGS. 1A and 1B depict an illustrative computing environment for a machine learning based identification and classification of database commands.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Organizations generally manage databases associated with the organization to store data. Such databases may provide various functionalities that may be of high significance to the organization. Generally, different databases may use different database commands to perform the same, or substantially similar, operations. For example, "get," "read," and "select" may be database commands on three different databases that may perform the same operation, but are associated with different names. Since each database may comprise hundreds of database commands, and there may be numerous databases, it may not be possible for a human to understand and/or remember the database commands. Due to a complexity of databases, many human database administrators may have knowledge of a small portion of available databases. Accordingly, they may have knowledge of some of the database commands that perform same, or substantially similar, operations, but may be unaware of other database commands. Valuable time may be spent in understanding different databases, and/or operations performed by their respective database commands. In some instances, subject matter experts may provide knowledge and information with respect to certain databases, but not with respect to others. Accordingly, there may be a knowledge gap in an understanding of functionalities and/or capabilities across a spectrum of databases.

Also, there may be frequent changes and/or updates to databases and/or database commands. For example, new database commands may be added to a database, and new databases may be added. In some instances, different database providers may release different versions of their databases, with new commands, new functionalities, and so forth. Such releases may be at different times. Generally, information about databases and database commands may be available over the internet, and documentation provided by a database provider may include information about database commands, command type, associated syntax, parameters, and so forth. In many instances, the documentation may be not in a searchable format, and searches across database documentations may also not be enabled. Time consuming, manual determination of the changes may not be efficient, or reliable.

In some instances, databases, and/or database commands may need to be periodically monitored to ensure compliance with laws and regulations, and/or security profiles for organizations. Also, for example, database commands may need to be periodically monitored to detect potentially unauthorized activity, and/or mitigate effects of such activity. For example, database commands may need to be monitored for authorized access to enterprise resources by enterprise personnel, as well as users of enterprise offerings. However, given the large number of databases, associated database commands, release notes, updates, and changes to the searchable repository itself, it may not be humanly possible for an organization's security personnel to effectively monitor enterprise resources. Accordingly, it may be of high significance for an enterprise organization to devise ways in which to determine changes to databases in real-time, create and/or update a searchable repository, so as to manage, maintain, and/or utilize the databases with speed and accuracy.

Some aspects of the disclosure relate to creating an intelligent virtual assistant to address the aspects described herein. Problems described herein arise in database resource utilization, security of information technology resources, and so forth, and are in the realm of computer networks and devices. Also, for example, solutions provided herein are rooted in technology. In particular, as described herein, one or more special purpose computers may be configured to perform the operations to provide solutions. Accordingly, some aspects of the disclosure relate to a machine learning based identification and classification of database commands. In particular, aspects of the disclosure relate to identifying database commands, classifying them, determining and associating levels of vulnerability with database commands, and providing such information in a searchable format that may be queried as an intelligent assistant.

Figure 1B:
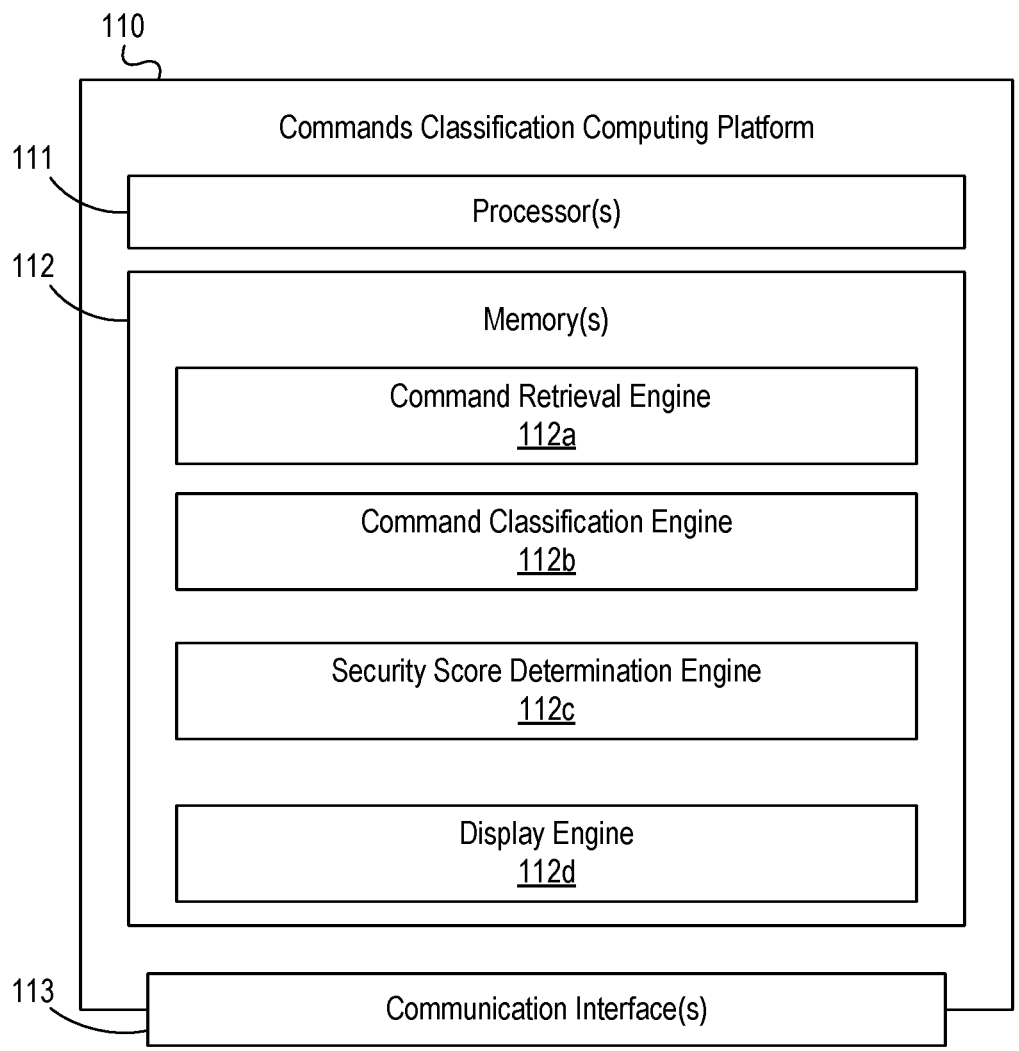

FIGS. 1A and 1B depict an illustrative computing environment for a machine learning based identification and classification of database commands. Referring to FIG. 1A, computing environment 100 may include one or more computer systems. For example, computing environment 100 may include a commands classification computing platform 110, enterprise computing infrastructure 120, an enterprise data storage platform 130, first display device 140 (including a first user interface), second display device 150 (including a second user interface), and external database 160.

As illustrated in greater detail below, commands classification computing platform 110 may include one or more computing devices configured to perform one or more of the functions described herein. For example, commands classification computing platform 110 may include one or more computers (e.g., laptop computers, desktop computers, servers, server blades, or the like) and/or other computer components (e.g., processors, memories, communication interfaces).

Enterprise computing infrastructure 120 may include one or more computing devices and/or other computer components (e.g., processors, memories, communication interfaces). In addition, enterprise computing infrastructure 120 may be configured to host, execute, and/or otherwise provide one or more user interfaces, for example, associated with first display device 140 and second display device 150. For example, enterprise computing infrastructure 120 may be configured to host, execute, and/or otherwise provide one or more applications associated with an enterprise organization. In some instances, enterprise computing infrastructure 120 may be configured to provide various enterprise and/or back-office computing functions for an enterprise organization. For example, enterprise computing infrastructure 120 may manage and/or monitor various servers and/or databases that store and/or otherwise maintain information, historical data, user data, personal information, and/or other information. In addition, enterprise computing infrastructure 120 may process and/or otherwise execute commands on databases based on scripts, commands and/or other information received from other computer systems included in computing environment 100. Additionally or alternatively, enterprise computing infrastructure 120 may receive instructions from commands classification computing platform 110 and execute the instructions in a timely manner.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data. For example, enterprise data storage platform 130 may be configured to store and/or otherwise maintain, databases, database commands, clusters of database commands, log files, security profiles, security scores, and so forth. Additionally or alternatively, enterprise computing infrastructure 120 may load data from enterprise data storage platform 130, manipulate and/or otherwise process such data, and return modified data and/or other data to enterprise data storage platform 130 and/or to other computer systems included in computing environment 100.

First display device 140 may be an enterprise computing device, such as, associated with a personal computing device (e.g., desktop computer, laptop computer) or mobile computing device (e.g., smartphone, tablet) First display device 140 may be a device on, and/or having access to, private network 170, of an enterprise organization. In addition, first user interface associated with first display device 140 may be linked to and/or used by a specific enterprise user (e.g., an employee of an organization operating commands classification computing platform 110). Also, for example, first user interface associated with first display device 140 may be configured to interact with the enterprise user, receive a query, and provide one or more search results in response to the query. Generally, first user interface associated with first display device 140 may interact with privately available information (e.g., information restricted to enterprise users).

Second display device 150 may be a user computing device, such as, associated with a personal computing device (e.g., desktop computer, laptop computer) or mobile computing device (e.g., smartphone, tablet) Second display device 150 may be a device on, and/or having access to, public network 180, and external to an enterprise organization. In addition, second user interface associated with second display device 150 may be linked to and/or used by a specific user (e.g., an employee of another organization different from the organization operating commands classification computing platform 110). Also, for example, second user interface associated with second display device 150 may be configured to interact with the user, receive a query, and provide one or more search results in response to the query. Generally, second user interface associated with second display device 150 may interact with publicly available information.

External database 160 may comprise one or more databases provided by a database provider. For example, database 160 may be a relational (e.g., generally based on a schema) or non-relational (e.g., generally less well-defined structure). Database 160 may be provided by a variety of vendors, and may be made available over private networks (e.g., private network 170), public networks (e.g., public network 180), and/or cloud servers. In some instances, database 160 may be secured and allow restricted access to enterprise organizations, and/or groups of employees within the enterprise organizations. In some instances, database 160 may be provided as a service (DBaaS). In some embodiments, commands classification computing platform 110 may utilize one or more application programming interfaces (APIs), such as an API for Open Database Connectivity (ODBC), to connect to database 160.

Computing environment 100 also may include one or more networks, which may interconnect one or more of commands classification computing platform 110, enterprise computing infrastructure 120, enterprise data storage platform 130, first display device 140 (including a first user interface), second display device 150 (including a second user interface), and external database 160. For example, computing environment 100 may include a private network 170 (which may, e.g., interconnect commands classification computing platform 110, enterprise computing infrastructure 120, enterprise data storage platform 130, first display device 140, and/or one or more other systems which may be associated with an organization) and public network 180 (which may, e.g., interconnect second display device 150, external database 160, with private network 170 and/or one or more other systems, public networks, sub-networks, and/or the like). In some embodiments, public network 180 may be a high generation cellular network, such as, for example, a 5G or higher cellular network. In some embodiments, private network 170 may likewise be a high generation cellular enterprise network, such as, for example, a 5G or higher cellular network. In some embodiments, computing environment 100 also may include a local network (which may, e.g., interconnect user interface 140 and one or more other devices with each other).

In one or more arrangements, enterprise computing infrastructure 120, enterprise data storage platform 130, first display device 140 (including a first user interface), second display device 150 (including a second user interface), and external database 160, and/or the other systems included in computing environment 100 may be any type of computing device capable of receiving input via a user interface, and communicating the received input to one or more other computing devices. For example, enterprise computing infrastructure 120, enterprise data storage platform 130, first display device 140 (including a first user interface), second display device 150 (including a second user interface), and external database 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of commands classification computing platform 110, enterprise computing infrastructure 120, enterprise data storage platform 130, first display device 140 (including a first user interface), second display device 150 (including a second user interface), and external database 160, may, in some instances, be special-purpose computing devices configured to perform specific functions.

Referring to FIG. 1B, commands classification computing platform 110 may include one or more processors 111, memory 112, and communication interface 113. A data bus may interconnect processor 111, memory 112, and communication interface 113. Communication interface 113 may be a network interface configured to support communication between commands classification computing platform 110 and one or more networks (e.g., network 150, network 160, a local network, or the like). Memory 112 may include one or more program modules having instructions that when executed by processor 111 cause commands classification computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of commands classification computing platform 110 and/or by different computing devices that may form and/or otherwise make up commands classification computing platform 110. For example, memory 112 may have, store, and/or include a command retrieval engine 112a, a command classification engine 112b, a security score determination engine 112c, and a display engine 112d.

Command retrieval engine 112a may have instructions that direct and/or cause commands classification computing platform 110 to retrieve, by a computing device and from a first database of a plurality of databases, a database command, as discussed in greater detail below. In some embodiments, command retrieval engine 112a may have instructions that direct and/or cause commands classification computing platform 110 to retrieve, from the plurality of databases, one or more log files.

Command classification engine 112b may have instructions that direct and/or cause commands classification computing platform 110 to identify, by the computing device and for the database command and based on a machine learning model, one or more database commands from the plurality of databases, wherein the one or more database commands perform operations similar to the database command. In some embodiments, command classification engine 112b may have instructions that direct and/or cause commands classification computing platform 110 to classify, by the computing device and based on a machine learning model, the one or more database commands into clusters, where database commands in a given cluster perform operations similar to one another.

Security score determination engine 112c may have instructions that direct and/or cause commands classification computing platform 110 to determine, by the computing device and for the database command, a security score indicative of a level of vulnerability associated with the database command. For example, a database command associated with a high level of vulnerability may be associated with a low security score, and a database command associated with a low level of vulnerability may be associated with a high security score. In some embodiments, security score determination engine 112c may have instructions that direct and/or cause commands classification computing platform 110 to determine, by the computing device and for the given cluster, a security score indicative of a level of vulnerability associated with database commands in the given cluster. Also, for example, security score determination engine 112c may have instructions that direct and/or cause commands classification computing platform 110 to train a machine learning model to determine the security score for the database command, and/or cluster of database commands.

Display engine 112d may have instructions that direct and/or cause commands classification computing platform 110 to provide, via an interactive graphical user interface, the database command and the security score. In some embodiments, display engine 112d may have instructions that direct and/or cause commands classification computing platform 110 to receive, via a graphical user interface, a query, and provide, via the graphical user interface, a response to the query.

FIG. 2 depicts an illustrative event sequence for a machine learning based identification and classification of database commands. Referring to FIG. 2, at step 201, commands classification computing platform 110 may retrieve, by a computing device and from a first database of a plurality of databases, a database command. A "database", as used herein, may be any data structure that stores data. For example, a database may be a relational (e.g., generally based on a schema) or non-relational (e.g., generally less well-defined structure). A "database command", as used herein, may generally refer to any instruction that may be used to communicate with the database. Although for purposes of this description, examples of database commands are provided in the English language, it may be understood that the database commands may be in any natural language, and/or programming language. Also, for example, determining database commands that are similar to one another is described herein with example commands in the English language; but the determining may be performed in other languages, and/or across two or more languages. For example, the description herein may apply to a database in French, and database commands that may be in the French language. Also, for example, a first database command may be in English, and a second database command may be in French, and commands classification computing platform 110 may retrieve the first database command from a first database (e.g., in English), and a second database command from a second database (e.g., in French), and compare and/or classify the first database command and the second database command.

Databases may generally be provided by a variety of vendors, and may be made available over private networks (e.g., private network 170), public networks (e.g., public network 180), and/or cloud servers. In some instances, databases may be secured and allow restricted access to enterprise organizations, and/or groups of employees within the enterprise organizations. In some instances, databases may be provided as a service (DBaaS). In some embodiments, commands classification computing platform 110 may utilize one or more application programming interfaces (APIs), such as an API for Open Database Connectivity (ODBC), to connect to available databases.

Generally, database commands may perform functions associated with a database. For example, some database commands may perform a search of contents of the database, other database commands may store, delete, retrieve, rearrange, and/or otherwise manipulate contents of the database. In some embodiments, a database command may structure the contents of the database, add an index, add metadata to the contents, add associations between objects in the database, and so forth.

In some embodiments, at step 201, commands classification computing platform 110 may classify database commands from the plurality of databases based on a type of command. For example, in database commands may be classified as definition commands, query commands, manipulation commands, control commands, transaction commands, and so forth. For example, database commands for defining a database structure, including commands for creating, and/or modifying a structure of database objects may be classified as definition commands. Also, for example, database commands for querying a database may be classified as query commands. As another example, database commands for manipulating objects in a database, including commands for storing, updating, modifying, retrieving, and/or deleting database objects may be classified as manipulation commands. Also, for example, database commands for securing objects in a database may be classified as control commands. As another example, database commands for managing transactional aspects associated with objects in a database may be classified as transaction commands.

In some embodiments, at step 201, commands classification computing platform 110 may retrieve a database command from a database of the plurality of databases, determine an operation performed by the database command, and classify the database command based on the operation. In some embodiments, commands classification computing platform 110 may identify database commands for a given database For example, for a database, say Database A, commands classification computing platform 110 may classify the database commands into categories as described herein. For example, a first group may comprise database commands in Database A that are for securing objects in Database A. As another example, a second group may comprise database commands in Database A that are for managing objects in Database A.

Also, for example, commands classification computing platform 110 may identify database commands across the plurality of databases. For example, for two databases, say Database A and Database B, commands classification computing platform 110 may classify the database commands into categories as described herein. For example, a first group may comprise database commands in Databases A and B that are for securing objects in the respective databases. As another example, a second group may comprise database commands in Databases A and B that are for managing objects in the respective databases.

At step 202, commands classification computing platform 110 may identify, by the computing device and for the database command and based on a machine learning model, one or more database commands from the plurality of databases, where the one or more database commands perform operations similar to the database command. Generally, different databases may use different database commands to perform the same, or substantially similar, operations. Due to a complexity of databases, many human database administrators may have knowledge of a small portion of the plurality of databases. Valuable time may be spent in understanding different databases, and operations performed by their respective database commands.

For example, "get," "read," and "select" may be database commands on three different databases that may perform the same operation, but are associated with different names. Since each database may comprise hundreds of database commands, and there may be numerous databases, it may not be possible for a human to understand and/or remember the database commands. Also, for example, new database commands may be added to a database, and new databases may be added. In some instances, different database providers may release different versions of their databases, with new commands, new functionalities, and so forth. Such releases are generally at different times. Accordingly, a special purpose computer, such as, for example, commands classification computing platform 110, may need to be configured as described herein, to identify the database commands, classify them, identify and assign levels of vulnerability, and so forth.

For example, in some instance, documentation provided by a database provider may include information about database commands, command type, associated syntax, parameters, and so forth. For example, the first database may include the database command "get," and the documentation may describe one or more ways of utilizing the database command. In some instances, the documentation may describe one or more ways "get" operates in different environments. Also, for example, the database may accept wildcard versions of "get," such as, for example, "*et" which would retrieve commands such as, "get," "let," "set," and so forth. In some embodiments, commands classification computing platform 110 may analyze the documentation to identify database commands that may have a similar functionality.

For example, a first database command "copyfile" in a first database may perform an operation of copying contents of one file to another. A second database command "cp," may perform the same operation in a second database. A documentation for the first database may describe the syntax for "copyfile" as "copyfile('file1.txt', 'file2.txt')." Likewise, a documentation for the second database may describe the syntax for "cp" as "cp('file1.txt', 'file2'.txt')." Accordingly, based on a similarity of syntax, commands classification computing platform 110 may identify the second database command as performing operations similar to the first database command.

In some embodiments, similar file may be stored in two databases, and respective database commands may be run to determine respective outputs. For example, commands classification computing platform 110 may execute the first database command "copyfile" in the first database and receive a first output indicating that contents of file1 have been copied to contents of file2. Also, for example, commands classification computing platform 110 may execute the second database command "cp" in the second database and receive a second output indicating that contents of file1 have been copied to contents of file2'. A comparison of file2 and file 2' may indicate that they have similar contents, and based on such similarity of outputs, commands classification computing platform 110 may identify the second database command "cp" as performing operations similar to the first database command "copyfile".

For example, a first database command "movefile" in a first database may perform an operation of moving a file from one portion of the first database to another. A second database command "mv," may perform the same operation in a second database. A documentation for the first database may describe the syntax for "movefile" as "movefile source destination," where movefile moves "source" to the file or folder "destination." Likewise, a documentation for the second database may describe the syntax for "mv" as "mv('file1.txt', 'file2'.txt')." Accordingly, based on a similarity of syntax, commands classification computing platform 110 may identify the second database command "my" as performing operations similar to the first database command "movefile".

In some embodiments, similar file may be stored in two databases, and respective database commands may be run to determine respective outputs. For example, commands classification computing platform 110 may execute the first database command "movefile" in the first database and receive a first output indicating that contents of "source" have been copied to contents of "destination". Also, for example, commands classification computing platform 110 may execute the second database command "mv" in the second database and receive a second output indicating that contents of file1 have been copied to contents of file2'. A comparison of file2 and file 2' may indicate that they have similar contents, and based on such similarity of outputs, commands classification computing platform 110 may identify the second database command "mv" as performing operations similar to the first database command "movefile".

In some embodiments, at step 202, commands classification computing platform 110 may classify, by the computing device, the one or more database commands into clusters, where database commands in a cluster perform operations similar to one another. For example, a first cluster may comprise the database commands, "get," "read," and "select." Also, for example, a second cluster may comprise the database commands, "copyfile," and "cp." As another example, a third cluster may comprise the database commands, "movefile," and "mv."

In some embodiments, at step 202, commands classification computing platform 110 may apply one or more similarity determination techniques to identify the one or more database commands that share similar functionality. For example, commands classification computing platform 110 may determine similarities between names of database commands, syntax, functionalities, command outputs, and so forth. For example, commands classification computing platform 110 may determine database commands such as "get", "collect", and "fetch" to be similar based on a determination that they are synonyms. In some embodiments, commands classification computing platform 110 may analyze the respective syntax to identify the one or more database commands. For example, terms used in the syntax, a structure of the syntax, and so forth, may be utilized to determine similarity. Also, for example, commands classification computing platform 110 may compare, for two different database commands, inputs to the database commands, and their respective outputs, and determine a similarity score for the respective outputs. Based on a determination that the similarity score is within a threshold, commands classification computing platform 110 may determine the two different database commands to be similar.

In some embodiments, commands classification computing platform 110 may utilize one or more such techniques to determine a confidence level with which the two different database commands are determined to be similar. For example, based on a determination that the database commands are synonyms, commands classification computing platform 110 may assign a "low" confidence level to the determination that the two different database commands are determined to be similar. However, based on a determination that their respective syntax are similar, commands classification computing platform 110 may assign a "medium" confidence level to the determination that the two different database commands are determined to be similar. Also, for example, based on a determination that the database commands have similar outputs, commands classification computing platform 110 may assign a "high" confidence level to the determination that the two different database commands are determined to be similar.

In some embodiments, at step 202, commands classification computing platform 110 may train a machine learning model to identify the one or more database commands. For example, a machine learning model may be trained to determine patterns between names of database commands, syntax, functionalities, command outputs, and so forth. In some embodiments, one or more clustering algorithm, such as a k-means clustering and/or a principal component analysis technique may be utilized to detect and classify various patterns. For example, commands classification computing platform 110 may determine that database commands "get," and "collect" are similar to one another. Accordingly, commands classification computing platform 110 may search the plurality of databases that have database commands that are synonymous with "get," and "collect." Accordingly, commands classification computing platform 110 may identify "fetch" as a database command that may have a high likelihood of being similar to "get," and "collect." Based on such a determination, commands classification computing platform 110 may apply additional similarity techniques (e.g., compare syntax, compare, inputs and outputs, and so forth) to determine that "fetch," "get," and "collect" are similar to one another with a high confidence level. In some embodiments, commands classification computing platform 110 may have previously identified that "get," "read," and "select" are database commands that are similar to one another. Accordingly, commands classification computing platform 110 may determine that "fetch," "get," "read," "select," and "collect" are similar to one another with a high confidence level.

In some embodiments, at step 202, commands classification computing platform 110 may store, by the computing device and in a searchable repository, an association between the database command and the one or more database commands. For example, commands classification computing platform 110 may store an association between "fetch," "get," and "collect." As another example, commands classification computing platform 110 may store an association between "get," "read," and "select." Also, for example, commands classification computing platform 110 may store an association between "fetch," "get," "read," "select," and "collect." As another example, commands classification computing platform 110 may store an association between "copyfile," and "cp." Also, for example, commands classification computing platform 110 may store an association between "movefile," and "mv."

At step 203, commands classification computing platform 110 may determine, by the computing device and for the database command, a security score indicative of a level of vulnerability associated with the database command. Organizations generally have security profiles that indicate a security policy for the organization. For example, the security profile may indicate a manner in which files may be saved, moved, copied, and/or deleted. Also, for example, the security profile may indicate access restrictions to enterprise resources for individuals, groups, and/or entities within and outside the organization. At any given time, a large number of database operations are performed, and it may be of great significance to an organization to effectively, and accurately, manage database operations so as to comply with a security profile. Changes in rules and regulations may further cause modifications to the security profiles of an organization. Accordingly, it may be of great significance to have an automated monitoring system that is adaptable, scalable, and agile.

Database commands may be associated with different levels of vulnerability. Deleting certain types of files in certain databases may be detrimental to an organization. Likewise, saving files in a first database may be considered to be of a higher level of vulnerability than saving files in a second database. Accordingly, commands classification computing platform 110 may associate a higher security score with the database command for "save <filename>" in the first database, and may associate a lower security score with the database command for "save <filename>" in the second database. Also, for example, certain databases may be utilized for data that may be more vulnerable than other type of data. For example, a first database that stores personal information, and so forth, may generally need greater protection than other databases. Accordingly, database commands performed on the first database may need to be allocated a level of vulnerability concomitant with potential loss of data due to an inadvertent or malicious activity, and/or other potential vulnerabilities.

Also, for example, a database command to "change password" may be associated with a high level of vulnerability. Accordingly, commands classification computing platform 110 may associate a higher security score with the database command to "change password." However, a database command to "drop table" may be associated with a low level of vulnerability. Accordingly, commands classification computing platform 110 may associate a lower security score with the database command to "drop table."

Also, for example, certain database commands may have a long-term and/or permanent consequence, and may therefore be associated with a higher level of vulnerability. For example, a database command to "wipe" a database may cause the database to be restored to factory state, thereby leading to a permanent loss of data. Accordingly, commands classification computing platform 110 may associate a higher security score with the database command to "wipe" the database. As another example, database commands in a Pre-Boot Authentication (PBA) may be prioritized. For example, database commands may be prioritized, from a higher priority to a lower priority, as "wipe," "lock," "remove users," and so forth. Accordingly, commands classification computing platform 110 may associate a security score of "high" with the database command "wipe, a security score of "medium" with the database command "lock," and a security score of "low" with the database command "remove users."

In some embodiments, at step 203, commands classification computing platform 110 may identify, by the computing device and for the database command, an operating environment, and commands classification computing platform 110 may determine the security score based on the operating environment for the database command. For example, a database command to "change password" in a production environment may be associated with a high level of vulnerability. Accordingly, commands classification computing platform 110 may associate a higher security score with the database command to "change password" in the production environment. However, a database command to change password in a testing environment may be associated with a lower level of vulnerability. Accordingly, commands classification computing platform 110 may associate a lower security score with the database command to "change password" in the testing environment.

As another example, a database command to "drop table" in a testing environment may be associated with a low level of vulnerability. Accordingly, commands classification computing platform 110 may associate a lower security score with the database command to "drop table" in the testing environment. However, a database command to "drop table" in a production environment may be associated with a high level of vulnerability. Accordingly, commands classification computing platform 110 may associate a higher security score with the database command to "drop table" in the production environment.

In some embodiments, at step 203, commands classification computing platform 110 may train the machine learning model to determine the security score for the database command. For example, the machine learning model may be trained to identify one or more of a type of database, a type of data stored in the database, an operating environment for the database command, and so forth. For example, based on such a determination, the machine learning model may determine levels of vulnerability associated with the one or more factors, apply weights to the one or more factors, and determine a security score for the database command as a weighted average of the levels of vulnerability.

Generally, information about databases and database commands may be available over the internet, and documentation provided by a database provider may include information about database commands, command type, associated syntax, parameters, and so forth. In many instances, the documentation may be not in a searchable format, and searches across database documentations may also not be performed. In some embodiments, commands classification computing platform 110 may retrieve, from the plurality of databases, information and data associated with the plurality of databases, and database commands, and create a repository (e.g., enterprise data storage platform 130) to store the retrieved items. In some embodiments, the repository may be configured to be searchable based on one or more of command type, database, data store, and so forth.

In some embodiments, the repository (e.g., enterprise data storage platform 130) may be structured in tabular format, where a row may represent a database command, and a column may represent attributes of the database command, such as, for example, a name, a syntax, the database that includes the database command, and so forth. In some embodiments, commands classification computing platform 110 may associate rows with one another to represent an association between database commands that perform similar operations. For example, rows comprising database commands in the same cluster may be associated with one another.

In some embodiments, as databases, database commands, and/or related documentation, may be updated and/or modified by the database provider, commands classification computing platform 110 may perform the retrieval in real-time and/or periodically (e.g., via tools to search and retrieve items from webpages), to update and/or modify the repository (e.g., enterprise data storage platform 130). Also, for example, commands classification computing platform 110 may determine whether a new database command has been retrieved by comparing the retrieved database command to database commands previously stored in the repository (e.g., enterprise data storage platform 130).

In some embodiments, upon a determination that the retrieved database command was not previously stored, commands classification computing platform 110 may automatically create a new row in the repository (e.g., enterprise data storage platform 130), and populate the entries under columns. In some embodiments, commands classification computing platform 110 may identify a new attribute for the database command, and/or the corresponding database, and may automatically create a new column in the repository (e.g., enterprise data storage platform 130) to store data values corresponding to the new attribute. Based on the new column, commands classification computing platform 110 may retrieve, from the internet, data values for the new attribute for previously existing rows in the repository (e.g., enterprise data storage platform 130).

For example, commands classification computing platform 110 may identify database command 1 as a new database command in Database A. Accordingly, commands classification computing platform 110 may create a new row, in the repository (e.g., enterprise data storage platform 130), corresponding to database command 1. Also, for example, commands classification computing platform 110 may identify a new attribute for database command 1. Accordingly, commands classification computing platform 110 may create a new column, say column J, in the repository (e.g., enterprise data storage platform 130), corresponding to the new attribute. However, as column J was not previously in the repository (e.g., enterprise data storage platform 130), commands classification computing platform 110 may retrieve information associated with the new attribute in order to populate column J for rows corresponding to database commands previously stored in the repository (e.g., enterprise data storage platform 130).

In some embodiments, commands classification computing platform 110 may determine whether the retrieved database command may perform operations similar to a previously stored database command. In some embodiments, upon a determination that the retrieved database command performs operations similar to a previously stored database command, commands classification computing platform 110 may automatically link the new row corresponding to the retrieved database command with a row corresponding to the previously stored database command in the repository (e.g., enterprise data storage platform 130). In some embodiments, commands classification computing platform 110 may automatically link the new row corresponding to the retrieved database command with a cluster associated with the previously stored database command.

In some embodiments, commands classification computing platform 110 may store an association between the database command and the security score. For example, a column in the tabular format for the repository, say column K, may correspond to a security score. Accordingly, for a row associated with database command, say row I, commands classification computing platform 110 may store the security score for the database command as an entry in row I, column K. In some embodiments, the security score may be based on a type of database, an operating environment for the database command, and/or a security profile for an organization. For example, a database command may be associated with a first security score that may be based on publicly available information (e.g., cluster size, type of database, operating environment, type of operation, and so forth). In some embodiments, commands classification computing platform 110 may make the first security score available to the public, via a publicly available interface for the repository (e.g., enterprise data storage platform 130).

In some embodiments, commands classification computing platform 110 may associate a second security score with the database command based, for example, on information and data that may be available from sources internal to the organization. For example, the second security score may be based on an organization's security profile. Accordingly, commands classification computing platform 110 may make the second security score inaccessible to the public, and may make the second security score available within the organization, for example, via a private interface for the repository (e.g., enterprise data storage platform 130).

In some embodiments, at step 203, commands classification computing platform 110 may rank database commands from the plurality of databases based on security scores associated with the database commands. For example, the database commands may be ranked based on respective security scores. Accordingly, commands classification computing platform 110 may determine a list of database commands with a high security level (e.g., low level of vulnerability). In some embodiments, a first threshold for security scores may be determined, and database commands with security scores higher than the first threshold may be determined to be secure. Also, for example, commands classification computing platform 110 may determine a list of database commands with a low security level (e.g., high level of vulnerability). In some embodiments, a second threshold for security scores may be determined, and database commands with security scores lower than the second threshold may be determined to be not secure.

In some embodiments, at step 203, commands classification computing platform 110 may determine, by the computing device and based on the security score, whether the database command has to be monitored by the computing device. Generally, database commands may need to be periodically monitored to ensure compliance with laws and regulations, and/or security profiles for organizations. Also, for example, database commands may need to be periodically monitored to detect potentially unauthorized activity, and/or mitigate effects of such activity. For example, database commands may need to be monitored for authorized access to enterprise resources by enterprise personnel, as well as users of enterprise business offerings. However, given the large number of databases, associated database commands, release notes, updates, and changes to the searchable repository itself, it may not be humanly possible for an organization's security personnel to effectively monitor enterprise resources. Accordingly, commands classification computing platform 110 may identify one or more database commands that may need to be monitored. For example, database commands with security scores lower than the second threshold may be determined to be not secure, and commands classification computing platform 110 may recommend such database commands for monitoring. Also, for example, database commands with security scores higher than the first threshold may be determined to be secure, and commands classification computing platform 110 may not recommend such database commands for monitoring.

In some embodiments, at step 203, commands classification computing platform 110 may train the machine learning model to determine whether the database command has to be monitored by the computing device. For example, as described herein, the machine learning model may be trained to determine the security scores, and may be trained to determine the first threshold and the second threshold. In some embodiments, the machine learning model may be trained to determine the security scores, first threshold, and second threshold, based on an organization, a database type, and so forth. Accordingly, the machine learning model may be trained to identify database commands that may be secure (e.g., based on the first threshold), and/or database commands that may not be secure (e.g., based on the second threshold), and provide appropriate recommendations.

In some embodiments, at step 203, commands classification computing platform 110 may train the machine learning model to detect patterns in an organization's utilization of database commands to identify database commands that may be monitored. For example, database commands that may access, retrieve, modify, delete, and/or otherwise make changes to a secured database may be determined to be database commands that may need to be monitored. Also, for example, a user external to an organization may interact with a user interface, and a database command may be performed as a result of such an interaction. Accordingly, commands classification computing platform 110 may train the machine learning model to automatically detect such user interactions, and identify database commands that may be monitored. As another example, publicly available information may indicate that one or more databases may include a security vulnerability, and commands classification computing platform 110 may train the machine learning model to automatically identify the database and/or database commands (e.g., based on the publicly available information, or based on feedback from security personnel internal to an organization), that may be monitored.

In some embodiments, at step 203, commands classification computing platform 110 may retrieve, from the plurality of databases, one or more log files. Generally, the term "log," as used herein, may refer to a record of activity related to a database command, and/or a database. For example, the log may be a record of an event, for example, when a database command was performed, an operating environment within which it was performed, a computing system where it was performed, a number of times it was performed, a type of input and output for the database command, and so forth. The log may also include security access validations for personnel, messages exchanged between users, client identifiers, an identity of a host server, a type of command (e.g., query, manipulation), and so forth. A record of such activities may be stored in a file, such as a log file.

Then, at step 203, commands classification computing platform 110 may identify, by parsing the one or more log files, a database command that was previously performed. In some embodiments, commands classification computing platform 110 may parse the log files. For example, text processing tools may be utilized to parse the contents of the log files. In some embodiments, commands classification computing platform 110 may generate structured data from the contents of the log files. Generally, commands classification computing platform 110 may be configured to apply supervised learning techniques based on one or more of random forest, gradient boosted trees, support vector machines, neural networks, decision trees, and so forth. In some embodiments, the contents of the log file may include unstructured data. Accordingly, the machine learning model may be trained via a combination of supervised and semi-supervised learning techniques. For example, commands classification computing platform 110 may be configured to apply a supervised learning technique in combination with a clustering and/or dimensional reduction technique. For example, a k-means clustering and/or a principal component analysis technique may be utilized.

Subsequently, at step 203, commands classification computing platform 110 may determine the security score for the database command based on the one or more log files. For example, details of an operation of the database command may be determined from an analysis of the log file, and commands classification computing platform 110 may determine the security score for the database command based on the analysis. For example, database commands originating from a user, and/or host server that may be associated with high vulnerability potential loss of data, may be associated with a security score indicative of a low security level.

In some embodiments, at step 203, commands classification computing platform 110 may determine, by the computing device and based on the security score, a second database command, from the plurality of databases, that may not be performed on the first database. For example, commands classification computing platform 110 may identify that a first database command is associated with a first security score indicative of a low security level, and may accordingly determine that the first database command may not be performed on the first database. In some embodiments, commands classification computing platform 110 may identify database commands that may be associated with the same cluster as the first database command, and may determine that the identified database commands may not be performed on the first database. As another example, commands classification computing platform 110 may identify database commands that may be associated with security scores that are within a threshold of the first security score, and determine that the identified database commands may not be performed on the first database.

In some embodiments, at step 203, commands classification computing platform 110 may determine, by the computing device, a first security score for a first database command of the first database. Then, commands classification computing platform 110 may associate, with a second database command of a second database of the plurality of databases, the first security score, where the second database command performs operations similar to the first database command. Generally, in some embodiments, database commands that are associated with a cluster may be associated with the same security score.

In some embodiments, at step 203, commands classification computing platform 110 may determine, by the computing device and for a given cluster, a security score indicative of a level of vulnerability associated with database commands in the given cluster. For example, the given cluster may be based on a type of database, a type of database command, an operating environment, and so forth. In some embodiments, database commands within the given cluster may be associated with the same security score. However, in some embodiments, database commands within the given cluster may be associated with different security scores. In such instances, commands classification computing platform 110 may determine a security score for the given cluster based on an aggregation of the different security scores.

In some embodiments, at step 203, commands classification computing platform 110 may store, in a searchable repository, the clusters and security scores associated with the clusters. For example, as described herein, the searchable repository may be in a tabular format, and commands classification computing platform 110 may associate a column in the tabular format with the security score for the cluster.

In some embodiments, at step 203, commands classification computing platform 110 may determine, based on the security score, an access restriction of a user to the first database. For example, different users (e.g., a system administrator, a database administrator, an authorized user, an external user, and so forth) of enterprise resources may have different access restrictions based on, for example, a business role, a business unit to which they belong, and so forth. Accordingly, users may have access controls for different databases, and/or database commands for the different databases. For example, some users may be allowed "read" access, and may not be allowed to "write" files, "move" files, "copy" files, and so forth. In some embodiments, certain users may not have access to perform data control operations. In some embodiments, certain users may not have access to perform transaction control operations. Accordingly, commands classification computing platform 110 may associate security scores for such database commands, and may automatically determine the access restriction of a user to a database.

In some embodiments, at step 203, commands classification computing platform 110 may train the machine learning model to determine an access restriction of a user to the first database. For example, a machine learning model may be trained to detect patterns between user profiles, security profiles, database commands, security scores, and so forth, and automatically determine the access restriction of a user to a database. For example, if a new user accesses the database, the machine learning model may determine the access restriction of the user, and initiate one or more steps based on the access restriction. For example, upon a determination that the access restriction indicates that the user may not perform the database command, the machine learning model may trigger a security alert for security personnel, and/or otherwise disable the user's ability to perform the database operation.

In some embodiments, commands classification computing platform 110 may identify, by the computing device, that the database command has been performed, and may determine, by the computing device, an access restriction of a user that has caused the database command to be performed. For example, users may be associated with an access restriction indicative of a level of access to enterprise resources. Accordingly, commands classification computing platform 110 may determine the security score for the database command based on the access restriction of the user. For example, upon a determination that the access restriction of the user is indicative of a high level of security clearance, commands classification computing platform 110 may associate the database command with a security score indicative of a high security level. Also, for example, upon a determination that the access restriction of the user is indicative of a low level of security clearance, commands classification computing platform 110 may associate the database command with a security score indicative of a low security level.

At step 204, commands classification computing platform 110 may provide, via an interactive graphical user interface, the database command and the security score. For example, commands classification computing platform 110 may provide information or data related to the database command and/or the security score. For example, commands classification computing platform 110 may provide the searchable repository (e.g., in tabular format) via the interactive graphical user interface.

In some embodiments, at step 204, commands classification computing platform 110 may receive, via the graphical user interface, a query, and commands classification computing platform 110 may search the searchable repository to determine a response to the query. For example, the received query may be related to a list of database commands with a high level of vulnerability, and commands classification computing platform 110 may search the searchable repository to determine the list of database commands with a high level of vulnerability. Also, for example, the received query may be related to a list of database commands with a low level of vulnerability, and commands classification computing platform 110 may search the searchable repository to determine the list of database commands with a low level of vulnerability.

As described herein, in some embodiments, commands classification computing platform 110 may perform the search based on a ranking, based on respective security scores, of the database commands. As described herein, the ranking may be based on an operating environment, user type, and so forth. For example, commands classification computing platform 110 may search the searchable repository for security scores that exceed a first threshold, to determine the list of database commands with a low level of vulnerability. Also, for example, commands classification computing platform 110 may search the searchable repository for security scores that are lower than a second threshold, to determine the list of database commands with a high level of vulnerability. In some embodiments, commands classification computing platform 110 may provide, via the graphical user interface, the response to the query. For example, commands classification computing platform 110 may provide the list of database commands with a low level of vulnerability, the list of database commands with a high level of vulnerability, and so forth.

In some embodiments, the query may be a request to identify database commands that perform the same operations as a database command. For example, a user may enter "get" in a text box within the user interface, and initiate a search. Accordingly, commands classification computing platform 110 may search the searchable repository and determine that "fetch," "read," "select," and "collect" are database commands that perform operations similar to the database command, "get." In some embodiments, commands classification computing platform 110 may provide, via the graphical user interface, the response to the query. For example, commands classification computing platform 110 may provide a listing of "fetch," "read," "select," and "collect" as the database commands that perform operations similar to the database command, "get."

As another example, the query may be a request to identify, for a database, one or more database commands that may not be performed on the database. Accordingly, commands classification computing platform 110 may search the searchable repository for the one or more database commands, and may provide, via the graphical user interface, the one or more database commands in response to the query.

Also, for example, the query may be a request to identify, for a database and/or a user, one or more database commands that may not be performed on the database by the user. Accordingly, commands classification computing platform 110 may search the searchable repository for the one or more database commands, and may provide, via the graphical user interface, the one or more database commands in response to the query.

As another example, the query may be a request to identify database commands that may need to be monitored. Accordingly, commands classification computing platform 110 may search the searchable repository for such database commands, and may provide, via the graphical user interface, the results in response to the search query.

As described herein, the interactive user interface may be configured to be available to the public, via a publicly available interface for the repository (e.g., enterprise data storage platform 130). For example, the interactive user interface may be a user interface associated with second display device 150. Accordingly, a user of display device 150 may interact with the publicly available interface to query the searchable repository for publicly available information. For example, a database command may be associated with a first security score that may be based on publicly available information (e.g., cluster size, type of database, operating environment, type of operation, and so forth). In some embodiments, commands classification computing platform 110 may make the first security score available to the public, via the publicly available interface (e.g., via second display device 150) for the repository, in response to a query.

Also, for example, the interactive user interface may be configured to be available via a private interface for the repository. For example, the interactive user interface may be a user interface associated with first display device 140. For example, users within an enterprise may search the repository for data and/or information available to an authorized user of the enterprise resources (e.g., enterprise resource infrastructure 120). In some embodiments, commands classification computing platform 110 may associate a second security score with the database command based, for example, on information and data that may be available from sources internal to the organization. For example, the second security score may be based on an organization's security profile. Accordingly, commands classification computing platform 110 may make the second security score inaccessible to the public (e.g., via second display device 150), and may make the second security score available within the organization, for example, via the private interface (e.g. via first display device 140) for the repository, in response to a query.

As another example, an organization may modify a database from a database provider, and/or add data structures, database commands, and so forth. For example, database commands "read," "select," and "collect" may be available to the public, and an organization may have generated the database command "fetch" within an internal database. Accordingly, when a user with access to the publicly available interface (e.g., via second display device 150) enters "get" in a text box within the publicly available user interface, and initiates a search, commands classification computing platform 110 may provide a listing of "fetch," "read," "select," and "collect" as the database commands that perform operations similar to the database command, "get." However, when an enterprise user with access to the privately available interface (e.g., via first display device 140) enters "get" in a text box within the privately available user interface, and initiates a search, commands classification computing platform 110 may provide a listing of "fetch," "read," "select," and "collect" as the database commands that perform operations similar to the database command, "get." In some embodiments, the privately available user interface may be a secure interface. For example, a user may access the publicly available user interface, may enter login credentials that may be authenticated, and may be provided access the privately available user interface.

Also, for example, the search results may be tailored to correspond to an access restriction of a user. For example, when a system administrator accesses the user interface, the search results may be tailored to the system administrator. As another example, when a database administrator accesses the user interface, the search results may be tailored to the database administrator. Also, for example, when a user in the production environment accesses the user interface, the search results may be tailored to the production environment. As another example, when a user in the testing environment accesses the user interface, the search results may be tailored to the testing environment.

Figure 3:
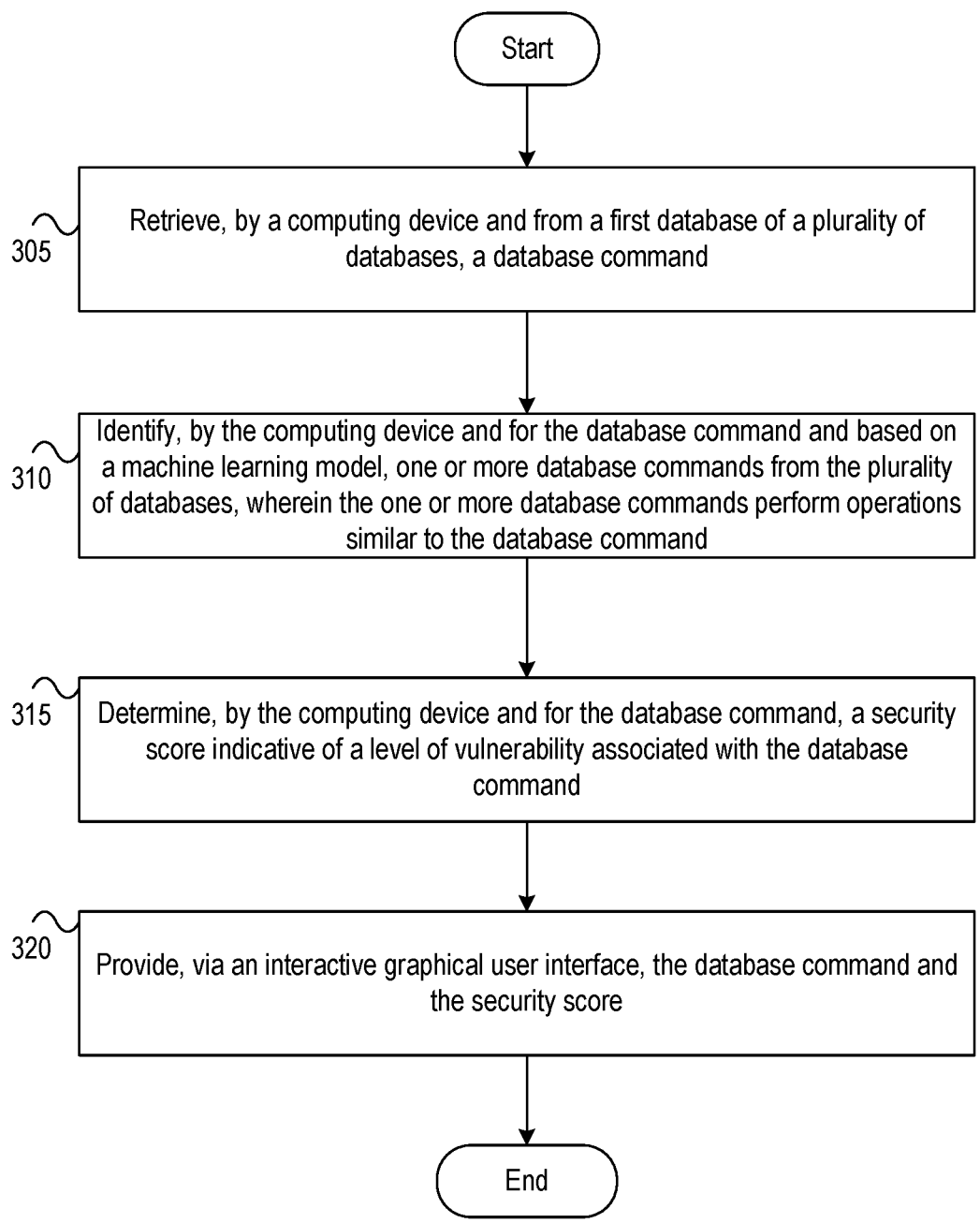
FIG. 3 depicts an illustrative method for a machine learning based identification and classification of database commands.

FIG. 3 depicts an illustrative method for a machine learning based identification and classification of database commands. Referring to FIG. 3, at step 305, commands classification computing platform 110 having at least one processor, and memory storing computer-readable instructions may retrieve, by a computing device and from a first database of a plurality of databases, a database command. At step 310, commands classification computing platform 110 may identify, by the computing device and for the database command and based on a machine learning model, one or more database commands from the plurality of databases, wherein the one or more database commands perform operations similar to the database command. At step 315, commands classification computing platform 110 may determine, by the computing device and for the database command, a security score indicative of a level of vulnerability associated with the database command. At step 320, commands classification computing platform 110 may provide, via an interactive graphical user interface, the database command and the security score.

Figure 4:
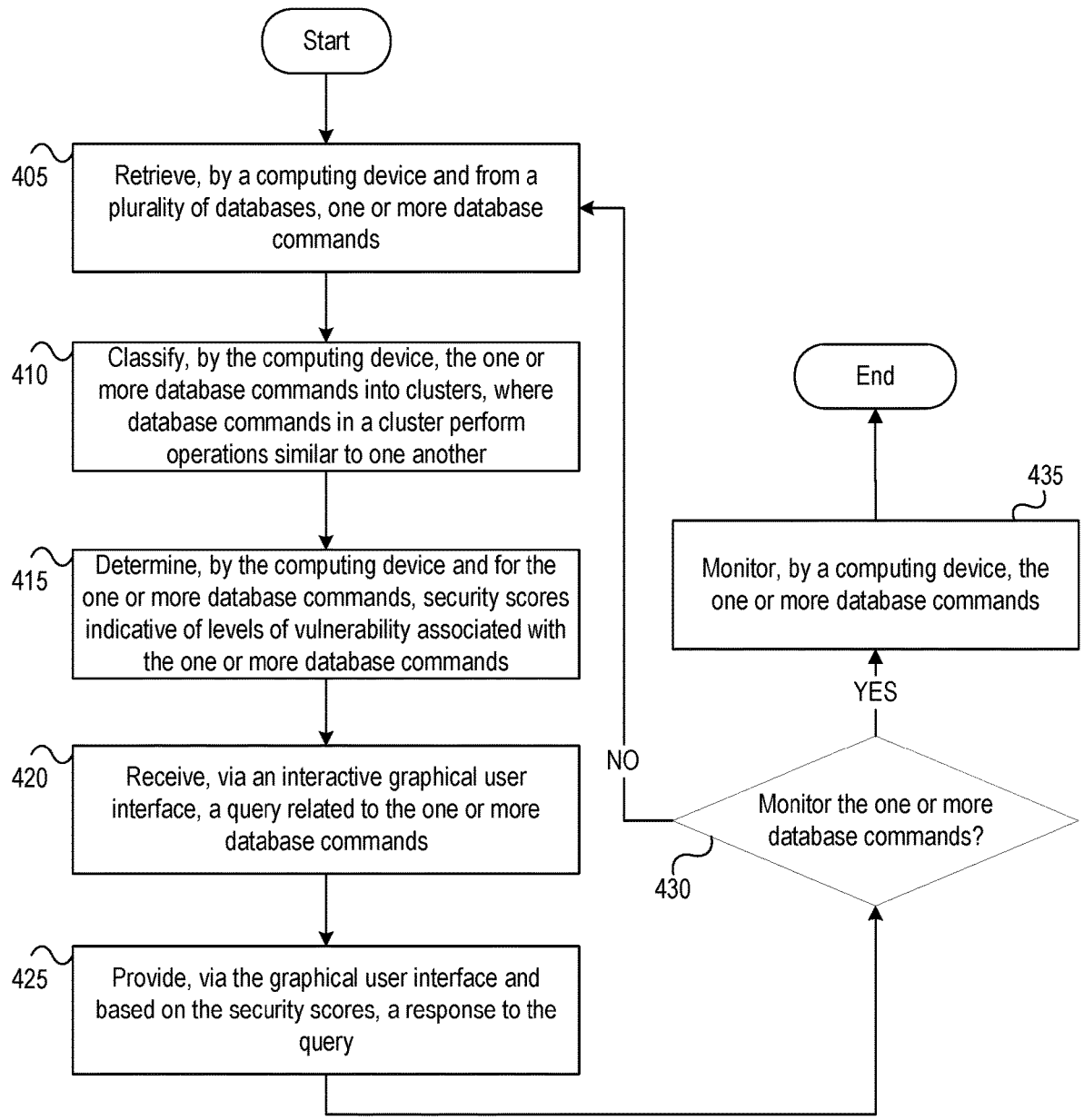
FIG. 4 depicts another illustrative method for a machine learning based identification and classification of database commands.

FIG. 4 depicts another illustrative method for a machine learning based identification and classification of database commands. Referring to FIG. 4, at step 405, commands classification computing platform 110 having at least one processor, and memory storing computer-readable instructions may retrieve, by a computing device and from a plurality of databases, one or more database commands. At step 410, commands classification computing platform 110 may classify, by the computing device, the one or more database commands into clusters, where database commands in a cluster perform operations similar to one another. At step 415, commands classification computing platform 110 may determine, by the computing device and for the one or more database commands, security scores indicative of levels of vulnerability associated with the one or more database commands. At step 420, commands classification computing platform 110 may receive, via an interactive graphical user interface, a query related to the one or more database commands. At step 425, commands classification computing platform 110 may provide, via the graphical user interface and based on the security scores, a response to the query.

At step 430, commands classification computing platform 110 may determine whether the one or more database commands have to be monitored by the computing device. Upon a determination that the one or more database commands have to be monitored by the computing device, the process may proceed to step 435. At step 435, commands classification computing platform 110 may monitor the one or more database commands. Upon a determination that the one or more database commands do not have to be monitored by the computing device, the process may return to step 405 to retrieve, and/or cluster, additional database commands.

Figure 5:
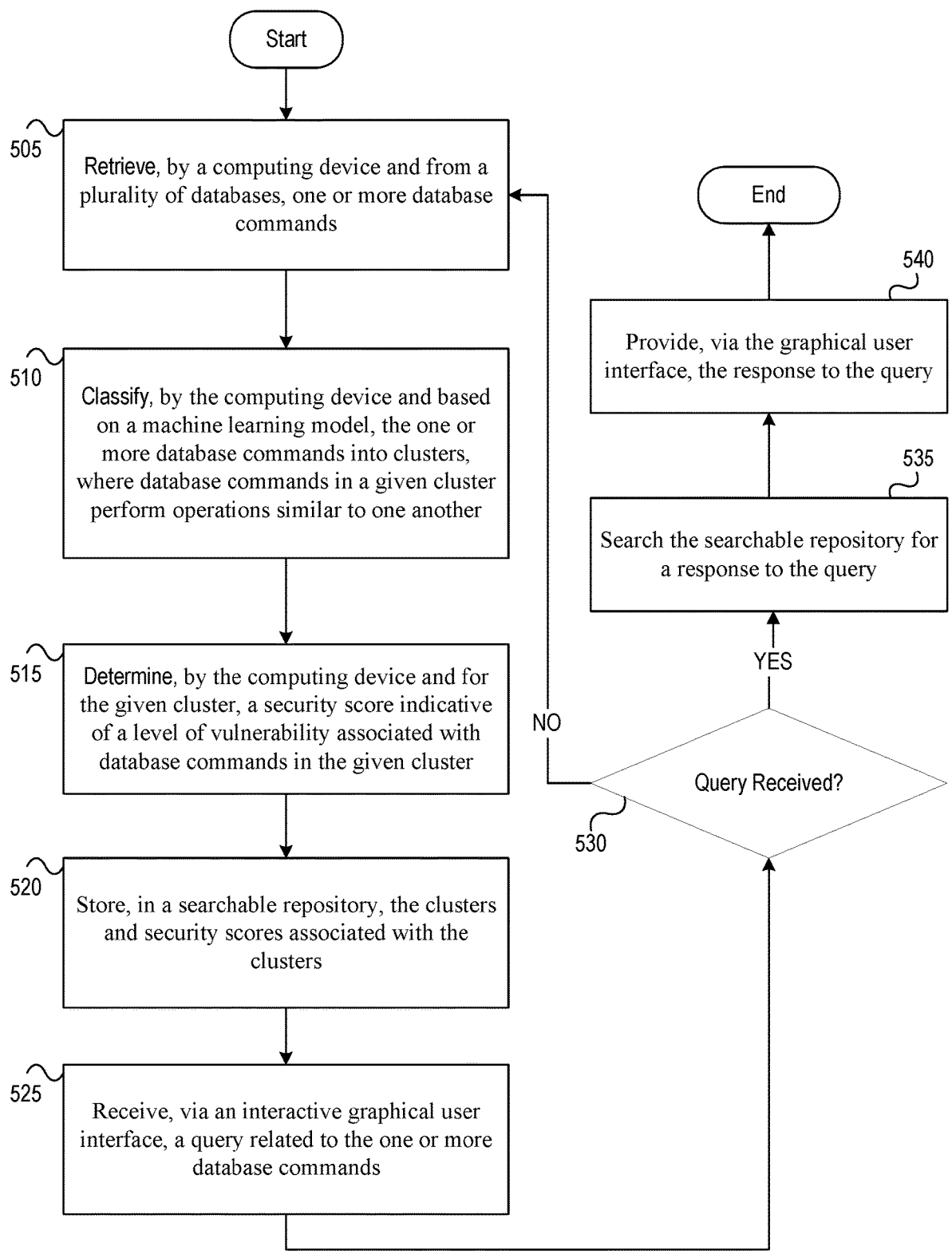
FIG. 5 depicts another illustrative method for a machine learning based identification and classification of database commands.

FIG. 5 depicts another illustrative method for a machine learning based identification and classification of database commands. Referring to FIG. 5, at step 505, commands classification computing platform 110 having at least one processor, and memory storing computer-readable instructions may retrieve, by a computing device and from a plurality of databases, one or more database commands. At step 510, commands classification computing platform 110 may classify, by the computing device and based on a machine learning model, the one or more database commands into clusters, where database commands in a given cluster perform operations similar to one another. At step 515, commands classification computing platform 110 may determine, by the computing device and for the given cluster, a security score indicative of a level of vulnerability associated with database commands in the given cluster. At step 520, commands classification computing platform 110 may store, in a searchable repository, the clusters and security scores associated with the clusters. At step 525, commands classification computing platform 110 may receive, via an interactive graphical user interface, a query related to the one or more database commands.

At step 530, commands classification computing platform 110 may determine whether the query was received. Upon a determination that the query was received, the process may proceed to step 535. At step 535, commands classification computing platform 110 may search the searchable repository for a response to the query. At step 540, commands classification computing platform 110 may provide, via the graphical user interface, the response to the query. Upon a determination that the query was not received, the process may return to step 505 to retrieve, and/or cluster, additional database commands.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive commands or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor; and
   memory storing computer-readable instructions that, when executed by the at least one processor, cause the computing platform to:
   retrieve, from a plurality of databases, a plurality of database commands;
   classify the plurality of database commands into a plurality of clusters, wherein database commands in each cluster of the plurality of clusters perform operations similar to one another, and wherein database commands are classified into at least one cluster of the plurality of clusters by:
      identifying a first database command from the plurality of database commands;
      identifying a second database command from the plurality of database commands;
      executing the first database command and the second database command;
      generating a first database command output based on the executed first database command;
      generating a second database command output based on the executed second database command;
      comparing the first database command output to the second database command output to determine a similarity of outputs; and
      based on the similarity of outputs being above a threshold, classifying the first database command and the second database command into the at least one cluster;
   determine, for the first database command, a security score indicative of a level of vulnerability associated with the first database command; and
   provide, via an interactive graphical user interface, the first database command and the security score.

2. The computing platform of claim 1, wherein the instructions comprise additional computer-readable instructions that, when executed by the at least one processor, cause the computing platform to:

determine, based on the security score, whether the first database command has to be monitored by the computing platform.

3. The computing platform of claim 1, wherein the instructions comprise additional computer-readable instructions that, when executed by the at least one processor, cause the computing platform to:
receive, via the interactive graphical user interface, a query; and
provide, via the interactive graphic al user interface and by searching a searchable repository, a response to the query.

4. The computing platform of claim 3, wherein the instructions comprise additional computer-readable instructions that, when executed by the at least one processor, cause the computing platform to:
store, in the searchable repository, an association between the first database command and the second database command.

5. The computing platform of claim 3, wherein the instructions comprise additional computer-readable instructions that, when executed by the at least one processor, cause the computing platform to:
store, in the searchable repository, an association between the first database command and the security score.

6. The computing platform of claim 3, wherein the query is for a list of database commands that are associated with a high level of vulnerability, wherein the response to the query is based on a ranking of the database commands from the plurality of databases, and wherein the ranking is based on security scores associated with the database commands.

7. The computing platform of claim 1, wherein the instructions comprise additional computer-readable instructions that, when executed by the at least one processor, cause the computing platform to:
retrieve, from the plurality of databases, one or more log files;
identify, by parsing the one or more log files, the second database command that was previously performed, and
wherein the security score for the second database command is based on the one or more log files.

8. The computing platform of claim 1, wherein the instructions comprise additional computer-readable instructions that, when executed by the at least one processor, cause the computing platform to:
identify, for the first database command, an operating environment, and
wherein the security score for the first database command is based on the operating environment.

9. The computing platform of claim 1, wherein the instructions comprise additional computer-readable instructions that, when executed by the at least one processor, cause the computing platform to:
associate, with the second database command, the security score.

10. The computing platform of claim 1, wherein the instructions comprise additional computer-readable instructions that, when executed by the at least one processor, cause the computing platform to:
train a machine learning model to identify at least one of the first database command and the second database command.

11. The computing platform of claim 1, wherein the instructions comprise additional computer-readable instructions that, when executed by the at least one processor, cause the computing platform to:
train a machine learning model to determine the security score for the first database command.

12. The computing platform of claim 1, wherein the instructions comprise additional computer-readable instructions that, when executed by the at least one processor, cause the computing platform to:
train a machine learning model to determine an access restriction of a user to a first database of the plurality of databases.

13. The computing platform of claim 1, wherein the instructions comprise additional computer-readable instructions that, when executed by the at least one processor, cause the computing platform to:
train a machine learning model to determine whether the first database command has to be monitored by the computing platform.

14. The computing platform of claim 1, wherein the instructions comprise additional computer-readable instructions that, when executed by the at least one processor, cause the computing platform to:
identify, that the first database command has been performed;
determine, an access restriction of a user that has caused the first database command to be performed, and
wherein the security score for the first database command is based on the access restriction of the user.

15. The computing platform of claim 1, wherein the instructions comprise additional computer-readable instructions that, when executed by the at least one processor, cause the computing platform to:
determine, based on the security score, an access restriction of a user to a first database of the plurality of databases.

16. A method, comprising:
at a computing platform comprising at least one processor, and memory:
retrieving, from a plurality of databases, one or more database commands;
classifying, the one or more database commands into clusters, wherein database commands in each cluster perform operations similar to one another and wherein classifying the one or more database commands into each cluster of the clusters includes:
for each unclassified database command of the one or more database commands:
identifying at least one second unclassified database command from the one or more database commands;
executing the unclassified database command and the at least one second unclassified database command;
generating a first database command output based on the executed unclassified database command;
generating at least one second database command output based on the at least one executed second unclassified database command;
comparing the first database command output to the at least one second database command output to determine at least one similarity of outputs of the first database command output and the at least one second database command output; and
based on the at least one similarity of outputs being above a threshold, classifying the unclassified database command and the at least one second database command in a cluster;
determining, for the one or more classified database commands, security scores indicative of levels of vulnerability associated with the one or more classified database commands;

receiving, via an interactive graphical user interface, a query related to the one or more classified database commands; and providing, via the interactive graphical user interface and based on the security scores, a response to the query.

17. The method of claim 16, further comprising:
determining, based on the security scores, whether the one or more database commands have to be monitored by the computing platform.

18. The method of claim 16, further comprising:
training a machine learning model to perform one or more of: the classifying, the determining the security scores, determining an access restriction of a user to a database of the plurality of databases, determining whether the one or more database commands have to be monitored.

19. One or more non-transitory computer-readable media storing instructions that, when executed by a computing platform comprising at least one processor and memory, cause the computing platform to:

retrieve, from a plurality of databases, one or more database commands;

classify, based on a machine learning model, the one or more database commands into clusters, wherein database commands in each cluster perform operations similar to one another and wherein classifying the one or more database commands into each cluster of the clusters includes:

for each unclassified database command of the one or more database commands:

identifying at least one second unclassified database command from the one or more database commands;

executing the unclassified database command and the at least one second unclassified database command;

generating a first database command output based on the executed unclassified database command;

generating at least one second database command output based on the at least one executed second unclassified database command;

comparing the first database command output to the at least one second database command output to determine at least one similarity of outputs of the first database command output and the at least one second database command output; and based on the at least one similarity of outputs being above a threshold, classifying the unclassified database command and the at least one second unclassified database command in a cluster;

determine, for each cluster of the clusters, a security score indicative of a level of vulnerability associated with database commands in the cluster;

store, in a searchable repository, the clusters and security scores associated with the clusters, and receive, via an interactive graphical user interface, a query related to the one or more classified database commands; and provide, via the interactive graphical user interface and based on the searchable repository, a response to the query.

* * * * *